Oct. 13, 1953

A. W. ANDERSEN 2,655,367

MOUNTING AND CASING FOR SCALES

Filed Feb. 11, 1950

INVENTOR.
Andrew W. Andersen
BY
*Daniel M. Kane*
ATTORNEY

Patented Oct. 13, 1953

2,655,367

UNITED STATES PATENT OFFICE 2,655,367

MOUNTING AND CASING FOR SCALES

Andrew W. Andersen, Babylon, N. Y.

Application February 11, 1950, Serial No. 143,702

1 Claim. (Cl. 265—66)

This invention relates to an improved mounting and casing for a scale and particularly to an improved handle or butt for a fishing rod having a casing or mounting for spring scales embodied therein.

It is an object of the invention invention to provide an improved article of the above character which can be used as a handle for an implement such as a fishing rod and which can be conveniently grasped in the hand of the operator and manipulated as required without interference from, or damage to, the scale or the casing or mounting for the scale and which can also be readily opened to provide access to the scale when it is desired to use it. In the normal operation of various implements such as fishing rods, the operator frequently requires or desires the use of a scale. Thus, a fisherman wishes to determine the weight of the fish which he has caught. By means of the present invention, the scale can be conveniently incorporated or mounted in the handle of the implement in a manner so that it is readily accessible for use when desired.

For a fuller understanding of the invention, reference should be had to the accompanying drawing in which.

Figure 1:
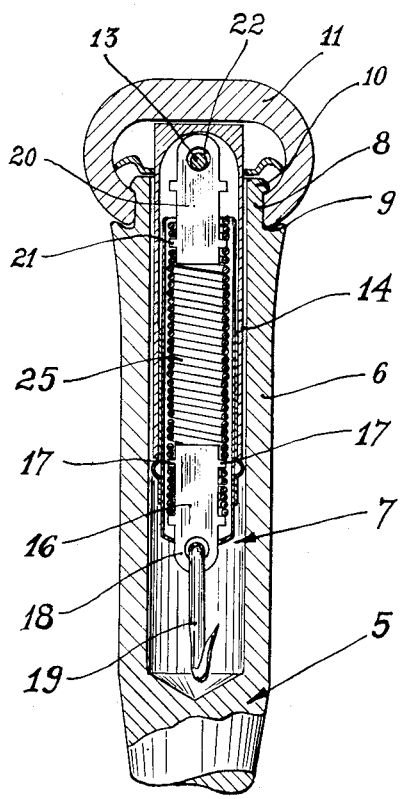
Fig. 1 is a longitudinal sectional view of the butt end of a handle for an implement such as a fishing rod embodying my improved invention.

My invention contemplates the provision of a handle for a fishing rod or similar implement having a hollow or tubular butt portion serving as a casing for a spring scale and also having a removable cap portion. The scale is disposed in the butt portion and is secured to one of the portions so that upon removal of the cap portion the scale is exposed and the portion to which the scale is connected serves as a handle for the scale.

In the accompanying drawings I have illustrated my invention as embodied in the butt end portion 5 of a handle for an implement such as a fishing rod. The handle is provided with a tubular, hollow portion 6 of a size to accommodate the spring scale 7. The outer end of the handle is provided with a collar of reduced diameter 8 having the overhanging shoulder 9 on its inner side and the bead or flange 10 at its extreme outer end. A cap 11 of bulbous or cup-shape is fitted over the collar 8 in the manner shown and is held in place between shoulder 9 and the bead 10. The cap is made of a resilient flexible material such as rubber, synthetic rubber, polyvinyl resin or the like. The cup is of concavo-convex shape with a closed base portion and an open face, the material around the opening being arranged to tightly embrace the collar 8, and in this manner the bead 10 will serve to firmly hold the cap in place while permitting its removal when desired.

Figure 2:
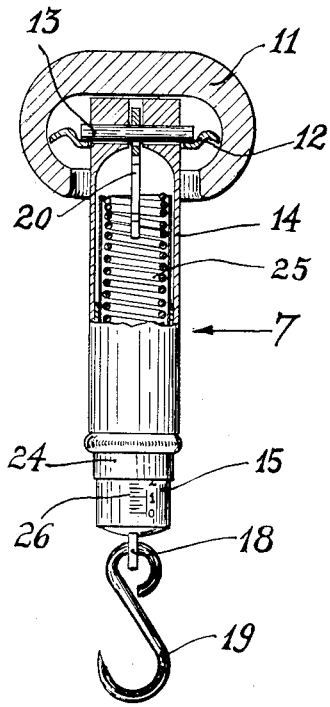
Fig. 2 is an elevational view partially in section of the scale and the cap portion removed from the butt portion of the handle.

Referring to the form of my invention shown in Figures 1 and 2 it will be seen that the upper end of scale housing 14 is mounted in the cap 11 with the slide 15 free to shift with respect thereto. The end of the housing may be anchored in the cap in any desired manner, as for instance, by providing an annular washer 12 disposed around the end of the housing and retained in place by means of crosspin 13 which extends across the upper end of the housing and projects beyond the sides thereof. The washer may be provided with an annular bead or ridge, as shown in Figures 1 and 2, which helps to prevent the accidental withdrawal of the end of the scale from the cap but permits the insertion of the scale into the cap.

The spring scale illustrated is one conventional type consisting of a housing 14 of tubular formation with slide 15 disposed therein so that it may shift longitudinally with respect thereto. A helical spring 25 serves to connect the housing and slide together in a manner that they may shift with respect to each other when a load or force is applied to the slide. Thus, adjacent one end of the helical spring a small metal plate 16 is provided with small protruding arms 17 which interengage with the coils of the spring. The plate is also provided with a portion 18 projecting beyond the end of the slide and having a hook 19 secured thereto outside the slide. A somewhat similar metal plate 20 is provided adjacent the opposite end of the spring and has similar lateral arms 21 interengaging with the coils of the spring. Plate 20 also has an aperture 22 through which the pin 13 extends. Thus, the plate 20 and pin 13 serve to secure one end of the spring to the housing, and the plate 16 and hook 19 serve to connect the opposite end of the spring to the slide.

As shown most clearly in Figure 2, the slide 15 may be provided with graduations 26 indicating the weight of the object being weighed on the scale. An adjustable sleeve 24 may be provided between the housing 14 and the slide 15 so that the scale can be properly adjusted. Thus, when the scale is held in upright position, as shown in Figure 2, and no force is applied thereto, sleeve 24 should be shifted downwardly so that the lower edge thereof is adjacent the zero reading. The sleeve is of such a size and shape that after adjustment it is frictionally held in place in the housing.

In assembling my improved casing or mounting for spring scales, the outer end of the housing first has the washer 12 assembled therearound beneath the pin 13 and this end of the housing is forceably inserted inside the cup 11. Thereafter, the resilient friction exerted by the cup prevents accidental detachment of the cup from the end of the scale. The lower end of the scale can then be inserted into the hollow end 6 of the handle portion and when fully inserted the open edge of the cup is distended and forced around the collar 8 with the result that the scale and cup assembly are securely assembled with the handle. When it is desired to use the scale, cup 11 is removed from the collar of the handle by distending the open edge of the cup. The scale reading is then properly adjusted by means of sleeve 24. The cup 11 provides a convenient handle for supporting the upper end of the scale while it is being used. The fish or other article to be weighed may be suspended directly from hook 19, or if preferred, a basket or container may first be suspended from the hook, then the scale reading may be readjusted by means of sleeve 24 and the fish or other article can then be weighed in the basket or other container.

When the handle is assembled, as shown in Figure 1, it may be grasped in the hand to support the fishing rod or other implement and the implement may be manipulated without interference from, or damage to, the scale.

Figure 3:
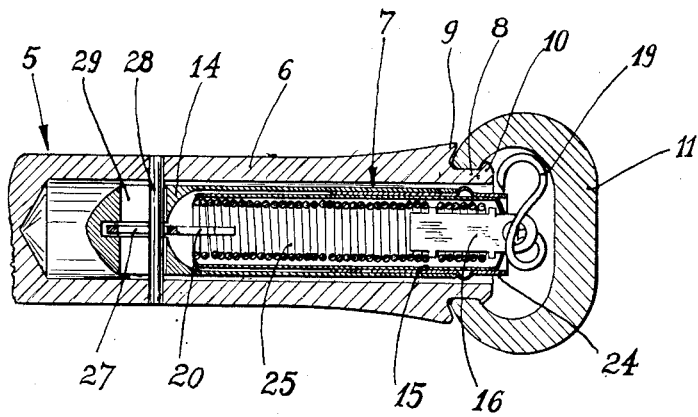
Fig. 3 is a longitudinal sectional view, similar to Fig. 1, showing a modified arrangement.

The assembly shown in Figure 3 is in inverse relationship with the assembly shown in Figures 1 and 2. Thus, the position of the scale is reversed and it is permanently assembled with the butt portion of the handle, and the cap portion of the handle, indicated at 11, may be removed so as to expose the lower end of the scale. Thus, in Figure 3, I have shown a spring scale 7 similar to that shown in Figures 1 and 2 having a housing 14 and a slide 15 interconnected by a helical spring 25.

As in the first form of scale, the connection between the helical spring and slide takes the form of plate 16, and the connection between the helical spring and the housing takes the form of a plate 20. Similarly, a hook 19 is supported from the exposed portion of the plate 16. However, the aperture 22 in plate 20 is replaced by an elongated slot 27, and instead of the pin 13, I provide a longer pin 28 which extends transversely through the slot 27 in plate 20, thence through slots 29 provided in the sides of the housing, and the two ends thereof are anchored in opposite sides of the butt end of the handle.

The spring scale is assembled with the butt end of the handle, as shown, and hook 19 may then be folded against the end of the handle and cap 11 assembled around the collar 8 in the manner previously described so as to completely encase the scale. When it is desired to use the scale, the cap portion of the handle is removed and the butt is then grasped in the hand of the operator and serves as a handle for the scale. The butt is held in upright position with the hook 19 depending downwardly. The slots 27 and 29 permit the scale to be partially withdrawn from the handle to a sufficient amount so that the graduations 26 may be read.

As in the first form of my invention, the sleeve 24 is adjusted so that the scale displays the proper reading, and the fish or other article may then be weighed.

It will thus be seen that I have provided an improved mounting or casing for a scale in the form of a handle for an implement. The handle is formed in two portions which may be separated to expose the scale, and one of the portions serves as a handle to support the scale when in use.

It will also be seen that the scale may be completely encased within the handle and that the handle may be grasped in the hand of the operator and manipulated as required without interference from or damage to the scale, the scale mounting or the casing.

Modifications may, of course, be made in the illustrated and described embodiments of my invention without departing from the invention as set forth in the accompanying claim.

I claim:

In a fishing rod having a handle with a hollow butt portion which is open at one end and which defines a longitudinally elongated chamber therein, and having an annular bead at said open end: a scale removably disposed in said chamber, said scale comprising a housing, a calibrated slide, a spring connected at one end to the housing and at the opposite end to one end of the slide, a hook secured to the opposite end of said slide, and a cap secured to said housing to serve as a handle for supporting said scale when in use, said cap being made of flexible resilient material of a size and shape to frictionally engage the annular bead of the hollow butt portion of the fishing rod handle so that it may readily be applied to said hollow butt portion to enclose the scale in the chamber in said hollow butt portion and also to serve as a bumper for said fishing rod handle, said cap being readily removable from said hollow butt portion to remove the scale from the chamber within said hollow butt portion, said cap being hollow and being provided with a relatively small opening through which the housing of the scale projects into said hollow cap, the inwardly projecting portion of said scale housing having an annular flange which is larger than said opening to prevent dislodgment of said scale housing from said hollow cap.

ANDREW W. ANDERSEN.

References Cited in the file of this patent

UNITED STATES PATENTS

| Number | Name | Date |
|---|---|---|
| 461,106 | Oberly | Oct. 13, 1891 |
| 952,552 | Weldon | Mar. 22, 1910 |
| 2,171,361 | Gits et al. | Aug. 29, 1939 |
| 2,274,817 | Zimmer | Mar. 3, 1942 |
| 2,458,811 | Koscielski | Jan. 11, 1949 |
| 2,501,940 | Hibbard | Mar. 28, 1950 |

FOREIGN PATENTS

| Number | Country | Date |
|---|---|---|
| 127,381 | Australia | Apr. 9, 1948 |